US011339897B2

(12) United States Patent
Gabriel et al.

(10) Patent No.: US 11,339,897 B2
(45) Date of Patent: May 24, 2022

(54) VALVE TRIM APPARATUS FOR USE WITH CONTROL VALVES

(71) Applicant: Fisher Controls International LLC, Marshalltown, IA (US)

(72) Inventors: Thomas Nelson Gabriel, Marshalltown, IA (US); Jason Gene Olberding, Marshalltown, IA (US); Daniel James Eilers, Marshalltown, IA (US); Kimball Ralph Barron, Marshalltown, IA (US); Raymond W. Micheel, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 70 days.

(21) Appl. No.: 16/117,907

(22) Filed: Aug. 30, 2018

(65) Prior Publication Data

US 2020/0072383 A1 Mar. 5, 2020

(51) Int. Cl.
*F16K 47/08* (2006.01)
*F16K 3/24* (2006.01)
(Continued)

(52) U.S. Cl.
CPC .............. *F16K 47/08* (2013.01); *F16K 3/246* (2013.01); *F16K 47/02* (2013.01); *F16K 47/04* (2013.01);
(Continued)

(58) Field of Classification Search
CPC .......... F16K 47/08; F16K 3/246; F16K 47/04; F16K 47/02; F16K 3/34; F16K 3/24;
(Continued)

(56) References Cited

U.S. PATENT DOCUMENTS 3,529,628 A * 9/1970 Cummins ............... F16K 47/08
137/625.3
3,780,767 A * 12/1973 Borg ...................... F16K 47/08
137/625.3
(Continued)

FOREIGN PATENT DOCUMENTS

WO 2016057767 4/2016
WO 2016187246 11/2016

OTHER PUBLICATIONS

International Searching Authority, "International Search Report," issued in connection with International Patent Application No. PCT/US2019/046982, dated Nov. 25, 2019, 6 pages.
(Continued)

*Primary Examiner* — Matthew W Jellett
*Assistant Examiner* — Christopher D Ballman
(74) *Attorney, Agent, or Firm* — Hanley, Flight & Zimmerman, LLC (57) ABSTRACT

Methods, apparatus, systems and articles of manufacture for valve trim apparatus for use with control valves are disclosed. An example valve trim apparatus for use with a fluid valve includes a cage positioned in a fluid flow passageway of a valve body, the cage including a primary valve seat and a secondary valve seat. The valve trim apparatus includes a valve plug slidably positioned within the cage, the valve plug including a primary sealing surface to sealingly engage the primary valve seat and a secondary sealing surface to sealingly engage the secondary valve seat, the primary sealing surface adjacent to a first end of the valve plug and the secondary sealing surface spaced away from the primary sealing surface along a longitudinal axis of the valve plug toward a second end of the valve plug.

15 Claims, 4 Drawing Sheets

(51) Int. Cl.
*F16K 47/02* (2006.01)
*F16K 47/04* (2006.01)
*E21B 34/02* (2006.01)
*F16K 3/34* (2006.01)

(52) U.S. Cl.
CPC .............. *E21B 34/02* (2013.01); *F16K 3/24* (2013.01); *F16K 3/34* (2013.01); *Y10T 137/86718* (2015.04); *Y10T 137/86791* (2015.04)

(58) Field of Classification Search
CPC ............. E21B 34/02; Y10T 137/86734; Y10T 137/86791; Y10T 137/86718
See application file for complete search history.

(56) References Cited

U.S. PATENT DOCUMENTS

| | | | | |
|---|---|---|---|---|
| 3,917,221 A * | 11/1975 | Kubota | ............ | F16K 47/08 251/127 |
| 3,990,475 A * | 11/1976 | Myers | ............ | F16K 3/34 137/625.3 |
| 4,108,210 A * | 8/1978 | Luthe | ............ | F16K 47/08 137/625.28 |
| 5,018,703 A * | 5/1991 | Goode | ............ | F16K 47/08 137/625.3 |
| 6,394,134 B1 * | 5/2002 | Kwon | ............ | F16K 47/08 137/625.3 |
| 6,536,472 B2 * | 3/2003 | Baumann | ............ | F16K 39/022 137/625.3 |
| 6,766,826 B2 * | 7/2004 | Baumann | ............ | F16K 47/08 137/625.3 |
| 6,772,993 B1 * | 8/2004 | Miller | ............ | F16K 47/08 251/333 |
| 6,807,985 B2 * | 10/2004 | Stares | ............ | F16K 47/08 137/625.33 |
| 7,448,409 B2 * | 11/2008 | Micheel | ............ | F16K 3/246 137/625.37 |
| 9,395,009 B2 * | 7/2016 | Lovell | ............ | F16J 15/028 |
| 9,528,632 B2 * | 12/2016 | Glaun | ............ | F16K 47/04 |
| 9,677,673 B2 * | 6/2017 | Ristau | ............ | F16K 1/42 |
| 10,119,416 B2 * | 11/2018 | Takata | ............ | F16K 1/54 |
| 10,215,306 B2 * | 2/2019 | Braeuer | ............ | F16K 3/32 |
| 2002/0017327 A1 * | 2/2002 | Kawaai | ............ | F16J 9/08 137/625.3 |
| 2002/0162591 A1 | 11/2002 | Baumann | | |
| 2013/0193360 A1 * | 8/2013 | Zhou | ............ | F16K 47/08 251/309 |
| 2013/0256572 A1 * | 10/2013 | Lovell | ............ | F16K 47/08 251/118 |
| 2017/0009907 A1 * | 1/2017 | Nitta | ............ | F16K 3/267 |
| 2017/0138507 A1 * | 5/2017 | Kluz | ............ | F16K 47/08 |
| 2017/0276252 A1 * | 9/2017 | McCaskill | ............ | F16K 3/246 |
| 2018/0328517 A1 * | 11/2018 | Zhou | ............ | F16K 47/08 |
| 2019/0024803 A1 * | 1/2019 | Sander | ............ | F16K 47/08 |

OTHER PUBLICATIONS

International Searching Authority, "Written Opinion," issued in connection with International Patent Application No. PCT/US2019/046982, dated Nov. 25, 2019, 6 pages.

* cited by examiner

VALVE TRIM APPARATUS FOR USE WITH CONTROL VALVES

FIELD OF THE DISCLOSURE

This disclosure relates generally to process control systems and, more particularly, to anti-cavitation valve trim apparatus for use with control valves.

BACKGROUND

Process units and/or systems like those used in the oil and gas production industry, refining, petrochemical and other manufacturing facilities typically include significant equipment assets, such as pumps. The condition, health, integrity, and/or performance of such pumps are essential to the efficiency and/or safety of processing plants.

SUMMARY

An example valve trim apparatus for use with a fluid valve comprises a cage positioned in a fluid flow passageway of a valve body, the cage including a primary valve seat and a secondary valve seat. A valve plug slidably positioned within the cage, the valve plug including a primary sealing surface to sealingly engage the primary valve seat and a secondary sealing surface to sealingly engage the secondary valve seat, the primary sealing surface adjacent to a first end of the valve plug and the secondary sealing surface spaced away from the primary sealing surface along a longitudinal axis of the valve plug toward a second end of the valve plug, the valve plug having a first portion extending from the primary sealing surface toward the secondary sealing surface to form a flow restricted passage between an inner surface of the cage and the first portion, the valve plug having a second portion extending from the first portion to the secondary sealing surface to form a recovery plenum between the second portion and the inner surface of the cage, wherein a first diameter of the first portion is less than a second diameter of the second portion.

An example valve trim apparatus for use with a fluid valve comprises a cage positioned in a fluid flow passageway of a valve body, the cage including a primary valve seat and a secondary valve seat. A valve plug movably coupled relative to the cage, the valve plug including a primary sealing surface to sealingly engage the primary valve seat and a secondary sealing surface to sealingly engage the secondary valve seat, the primary sealing surface adjacent to a first end of the valve plug and the secondary sealing surface spaced away from the primary sealing surface, the valve plug having a first portion extending from the primary sealing surface toward the secondary sealing surface, the first portion sized to reduce a velocity of a fluid when the valve plug moves between a closed position and an open position, the valve plug having a second portion extending from the first portion to the secondary sealing surface, the second portion sized to receive the fluid from the first portion and increase a pressure of the fluid, wherein a first diameter of the first portion is less than a second diameter of the second portion.

An example valve trim apparatus for use with a fluid valve comprises a cage positioned in a fluid flow passageway of a valve body. A valve plug slidably positioned within the cage to modulate fluid flow through the fluid flow passageway by moving between a closed position and an open position relative to the cage, the valve plug having a first portion extending from a first end of the valve plug toward a second end of the valve plug opposite the first end to form a flow restricted passage between an inner surface of the cage and the first portion, the valve plug having a second portion extending from the first portion toward the second end of the valve plug to form a recovery plenum between the second portion and the inner surface of the cage, wherein a first diameter of the first portion is less than a second diameter of the second portion.

BRIEF DESCRIPTION OF THE DRAWINGS

The figures are not to scale. Instead, the thickness of the layers or regions may be enlarged in the drawings. In general, the same reference numbers will be used throughout the drawing(s) and accompanying written description to refer to the same or like parts.

DETAILED DESCRIPTION

Cavitation is one of the leading causes of failure in control valve components. Cavitation occurs in control valves when there is insufficient pressure within a control valve system to maintain a fluid in a liquid state and/or when a liquid is subjected to rapid changes of pressure that cause the formation of cavities in the liquid where the pressure is relatively low. When the fluid within the control valve system is unable to maintain a liquid state, vapor pockets and/or small bodies of gas contained in the liquid (e.g., bubbles) form within the control valve. For example, the vapor pockets implode and can generate an intense shock wave when subjected to high pressures, which can eventually cause damage to components of the control valve. For example, cavitation may erode material from the valve plug, wear/erode the valve seal(s), and/or damage downstream piping. Such damage to components of the control valve system may result in a failure of the control valve.

Example valve trim apparatus disclosed herein may be used with control valves. Specifically, example valve trim disclosed herein provide certain fluid flow characteristics and/or pressure drop characteristics to reduce cavitation in a control valve. Example fluid control valves implemented with example valve trim apparatus disclosed herein may be employed in relatively high pressure drop applications (e.g., pressure drops of 3,000 psi). Such high pressure drop characteristics may be provided by a cage (e.g., a multi-stage pressure reducing cage) of the valve trim apparatus disclosed herein. Thus, example fluid control valves implemented with example valve trim apparatus disclosed herein may reduce a potential for high pressure liquid cavitation.

Additionally, example cages disclosed herein may include one or more apertures to provide desired fluid flow characteristics such as, for example, enhanced pressure recovery, reduction or elimination of noise and/or cavitation, etc. For example, pressure recovery is a flow characteristic of a fluid passageway that indicates an amount and/or percentage of increase in fluid pressure after a preceding decrease in fluid pressure. In examples in which a valve cage may produce a low pressure recovery, fluid pressure downstream from a throat of a passageway may be significantly less than fluid pressure upstream from the throat. Low pressure recoveries and/or reduced fluid pressure may result in undesired fluid flow characteristics such as, for example, cavitation and/or reduced noise attenuation. For example, if a fluid passageway includes a throat (e.g., a narrowed portion of the fluid passageway between two wider portions of the fluid passageway), the fluid pressure decreases as the fluid approaches the throat and increases as the fluid exits the throat. In such instances, the pressure recovery identifies the increase in fluid pressure from the throat (e.g., a lowest-pressure value) to the subsequent wider portion (e.g., a highest-pressure value downstream from the throat). The desired flow characteristics (e.g., enhanced pressure recovery, reduction of noise and/or cavitation, etc.) are achieved by varying a number and/or a geometry of the apertures.

Example valve plugs disclosed herein may include restrictions and/or recovery plenums to further provide desired fluid flow characteristics such as, for example, enhanced pressure recovery, enhanced/reduced fluid velocity, reduction or elimination of noise and/or cavitation, etc. For example, restrictions and/or recovery plenums disclosed herein may vary the velocity of a fluid to provide certain pressure drop characteristics to suit the needs of a particular control application.

Figure 1:
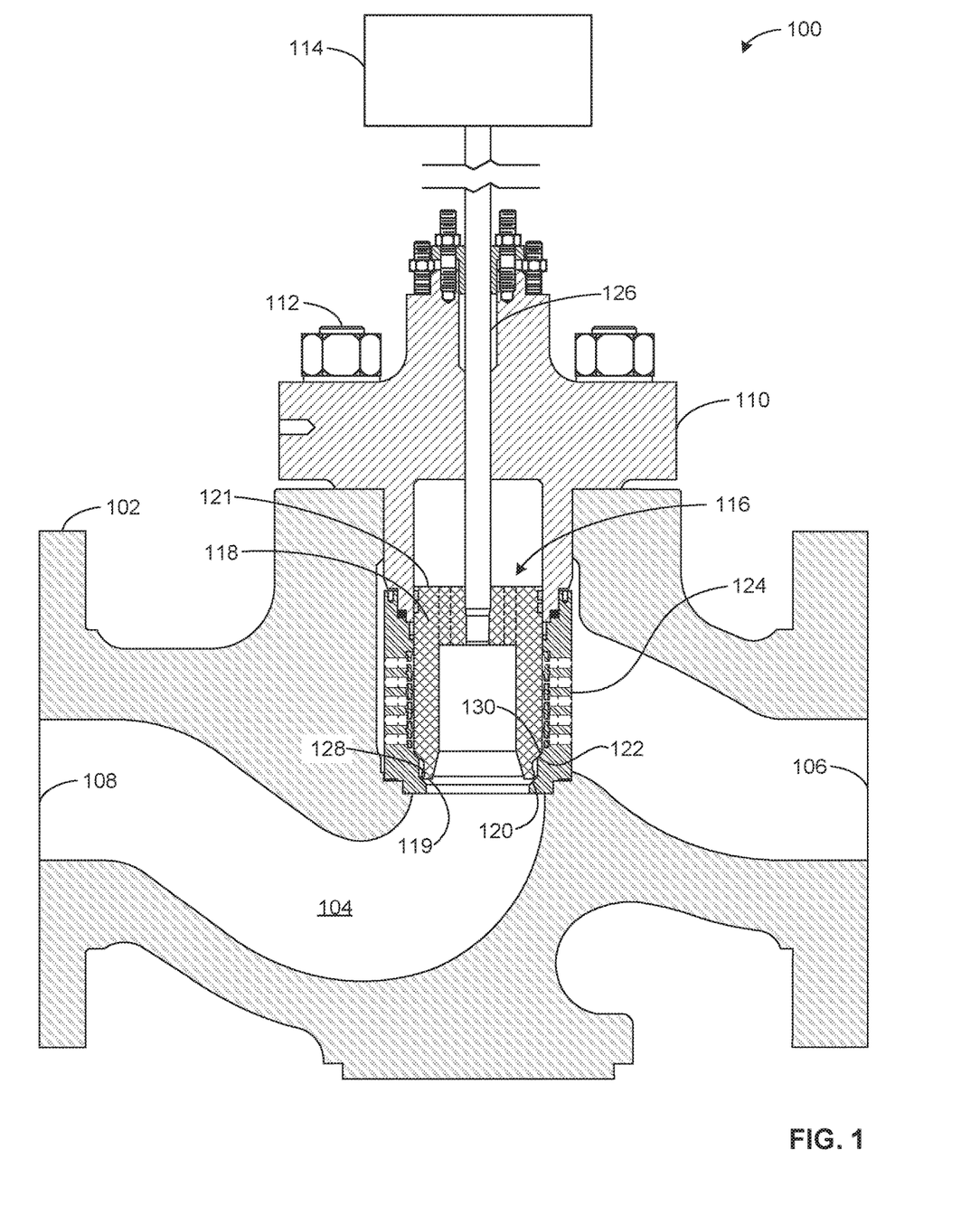
FIG. 1 is a cross-sectional view of an example control valve constructed in accordance with teachings of this disclosure.

FIG. 1 is a cross-sectional view of an example control valve 100 constructed in accordance with teachings of this disclosure. The control valve 100 of the illustrated example is a sliding stem valve. The control valve 100 of the illustrated example includes a valve body 102 that defines a fluid flow passageway 104 between an inlet 106 and an outlet 108. In the illustrated example, a fluid flows through the fluid flow passageway 104 in a flow-up orientation. A bonnet 110 is coupled to the valve body 102 via fasteners 112, and the bonnet 110 couples the valve body 102 to an actuator 114 (e.g., a pneumatic actuator). Valve trim 116 is disposed within the fluid flow passageway 104 formed via the valve body 102 to control fluid flow between the inlet 106 and the outlet 108. When the bonnet 110 is attached to the valve body 102, the bonnet 110 retains the valve trim 116 within the valve body 102.

The valve trim 116 of the illustrated example includes internal components of the control valve 100 that control fluid flow between the inlet 106 and the outlet 108 and/or imparts certain fluid flow characteristics to fluid flowing through the fluid flow passageway 104. The valve trim 116 of the illustrated example includes an example valve plug 118, an example primary valve seat 120, an example secondary valve seat 122, an example cage 124, and an example stem 126. For example, the stem 126 operatively couples the valve plug 118 to the actuator 114. In the illustrated example, the valve plug 118 is depicted as having a machined outer surface and a cylindrical body having a primary sealing surface 128 and a secondary sealing surface 130. However, in other examples, the valve plug 118 may any other structure (e.g., sliding stem valve plug) to vary the flow of fluid through the control valve 100. The outer surface of the valve plug 118 is sized to closely fit within the cage 124 so that the valve plug 118 is movable or slidable within the cage 124 relative to the primary valve seat 120 and/or the secondary valve seat 122.

As described in greater detail below, the cage 124 of the illustrated example defines the primary and secondary valve seats 120, 122 (e.g., integral seat angles). Specifically, the cage 124 and the primary and secondary valve seats 120, 122 of the illustrated example are integrally formed as a unitary body or structure. The cage 124 can facilitate maintenance, removal, and/or replacement of other components of the valve trim 116.

The valve plug 118 of the illustrated example includes a first end 119 and a second end 121 opposite the first end 119. In operation, the example actuator 114 (e.g., a pneumatic actuator) drives the valve plug 118 between a closed position at which the primary and secondary sealing surfaces 128, 130 of the valve plug 118 are sealingly engaged with the primary and secondary valve seats 120, 122, respectively, and an open position at which the primary and secondary sealing surfaces 128, 130 of the valve plug 118 are positioned at a distance away from the primary and secondary valve seats 120, 122. In some examples, at least one of the primary and secondary valves seats 120, 122 provide a metal-to-metal contact with the at least one of the primary and secondary sealings surfaces 128, 130, respectively. In some examples, the at least one of the primary and secondary valve seats 120, 122 provide a tight-fit clearance shut-off with the cage 124. In some examples, an orientation of the primary valve seat 120 is implemented on the secondary valve seat 122. In some examples, an orientation of the secondary valve seat 122 is implemented on the primary valve seat 120. Specifically, the valve plug 118 of the illustrated example moves relative to the primary and secondary valve seats 120, 122 between a fully closed position and a fully open position to modulate (e.g., allow and/or prevent) fluid flow through the fluid flow passageway 104 of the valve body 102.

Figure 2:
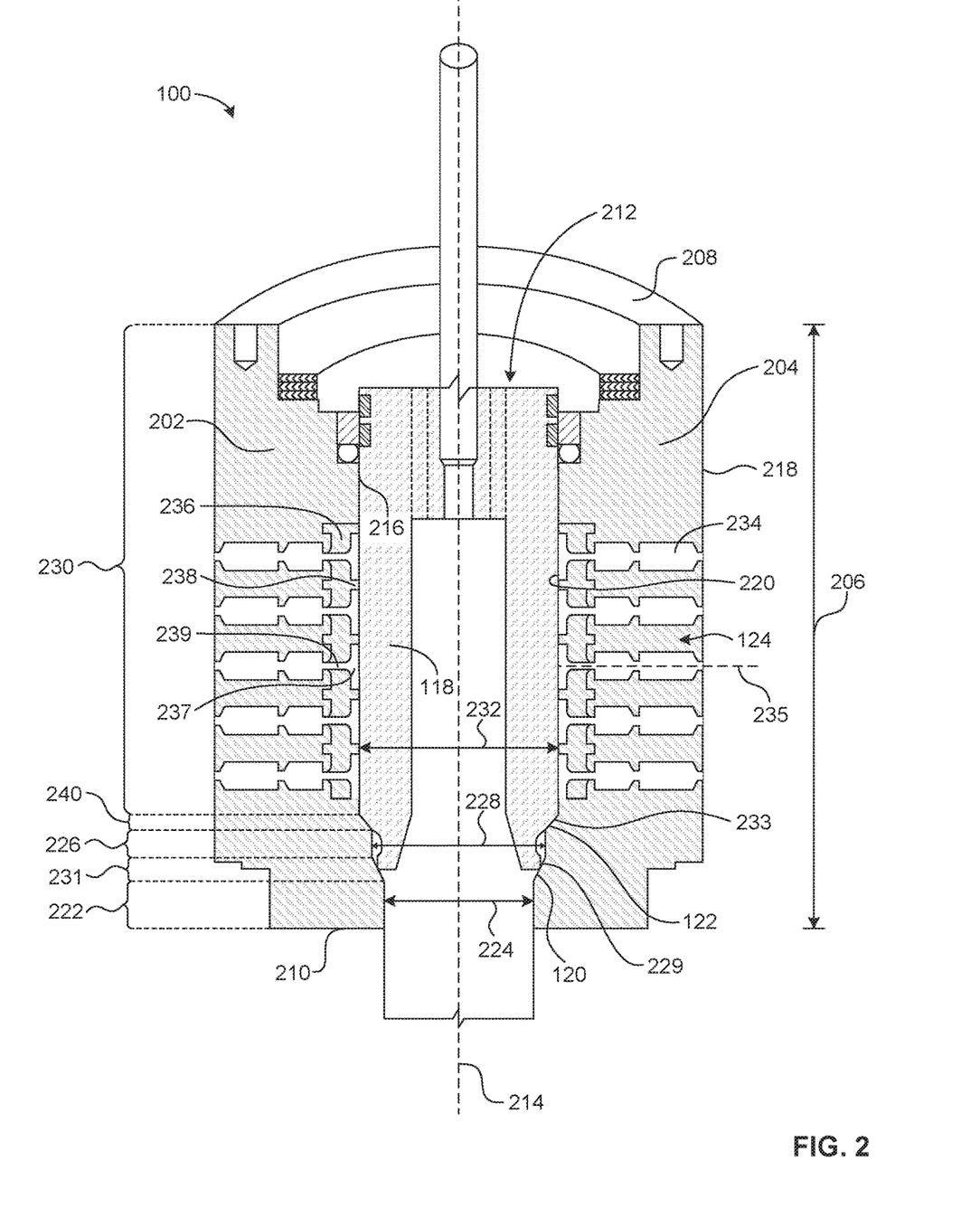
FIG. 2 is a cross-sectional view of the example control valve of FIG. 1.

FIG. 2 is a cross-sectional view of the example control valve 100 of FIG. 1. In the illustrated example, the cage 124 is disposed between the inlet 106 and the outlet 108 to impart certain flow characteristics to a fluid flowing through the fluid flow passageway 104. For example, the cage 124 of the illustrated example reduces noise, vibration and/or reduces or eliminates cavitation generated by a fluid flowing through the control valve 100. Additionally, the cage 124 of the illustrated example guides the valve plug 118 and provides lateral stability as the valve plug 118 travels between the open position and the closed position relative to the primary and secondary valve seats 120, 122, thereby reducing vibrations and/or other mechanical stress.

The cage 124 of the illustrated example includes a cage body 202. The cage body 202 of the illustrated example is a cylindrically shaped body. However, in other examples, the cage body 202 may have any other shape. The cage body 202 of the illustrated example includes a side wall 204 (e.g., a cylindrical wall) having a longitudinal length 206 defining a first end 208 and a second end 210 opposite the first end 208. The cage body 202 of the illustrated example includes an opening 212 extending through the cage body 202 along a longitudinal axis 214. The opening 212 extends between the first end 208 and the second end 210 to define an inner surface 216 (e.g., an interior wall surface) of the side wall 204 or the cage body 202 and an outer surface 218 (e.g., an exterior wall surface) of the side wall 204 or the cage body 202. An outer surface 220 of the valve plug 118 is sized to closely fit within the opening 212 of the cage 124.

In some examples, the primary and secondary valve seats 120, 122 may be positioned at any two points along the longitudinal length 206 of the cage body 202 between the first end 208 and the second end 210. To define the primary valve seat 120 (e.g., a ramped surface), the opening 212 along a first portion 222 of the cage body 202 includes a first dimensional characteristic 224 and the opening 212 along a second portion 226 of the cage body 202 includes a second dimensional characteristic 228 different than the first dimensional characteristic 224. For example, the first dimensional characteristic 224 is a first diameter and the second dimensional characteristic 228 is a second diameter different than the first diameter. In the illustrated example, the first dimensional characteristic 224 transitions into the second dimensional characteristic 228 via a ramped surface 229 (e.g., an angled transition) to define the primary valve seat 120. In other examples, the primary valve seat 120 may be beveled, angled, perpendicular, and/or canted relative to the longitudinal axis 214. Similarly, to define the secondary valve seat 122 (e.g., a ramped surface), the opening 212 along a third portion 230 of the cage body 202 includes a third dimensional characteristic 232 different than the second dimensional characteristic 228. For example, the third dimensional characteristic 232 is a third diameter different than the second diameter. In the illustrated example, the second dimensional characteristic 228 transitions into the third dimensional characteristic 232 via a second ramped surface 233 to define the secondary valve seat 122. In other examples, the secondary valve seat 122 may be beveled, angled, perpendicular, and/or canted relative to the longitudinal axis 214. In other examples, the primary valve seat 120, the secondary valve seat 122, and/or a combination thereof may be implemented as a separable valve seat ring positioned below the cage 124 in an example first position 231 and an example second position 240, respectively.

The cage 124 of the illustrated example includes a plurality of apertures 234 (e.g., holes, slots, etc.) positioned between the first end 208 and the second end 210 of the cage body 202. Specifically, the apertures 234 extend through the side wall 204 of the cage body 202 to provide fluid communication between the inner surface 216 and the outer surface 218. In other words, the apertures 234 enable fluid flow between the outer surface 218 and the inner surface 216 of the side wall 204. For example, in a closed position, the valve plug 118 blocks or prevents fluid flow through the apertures 234. In an open position, the valve plug 118 allows fluid flow through the apertures 234 and, thus, enables fluid flow between the outer surface 218 and the inner surface 216 of the side wall 204.

In some examples, each of the apertures 234 of the illustrated example has a longitudinal axis 235 that is non-parallel (e.g., perpendicular and/or canted) relative to the longitudinal axis 214 of the opening 212. The apertures 234 of the illustrated example may include one or more anti-cavitation, and/or pressure staged passages. For example, the first portion 222, the second portion 226, and/or the third portion 230 of the cage body 202 may include apertures 234 having various shapes, sizes, and/or spacing to control fluid flow and/or reduce or eliminate cavitation, and/or noise through the control valve 100. The apertures 234 are described in greater detail below in connection with FIG. 3.

In the illustrated example of FIG. 2, the first portion 222, the second portion 226, and/or the third portion 230 of the cage body 202 defines a throttling area. In the illustrated example, the side wall 204 of the cage body 202 includes a spiral relief channel 236 extending inward relative to the side wall 204 of the cage 124. In the illustrated example, the spiral relief channel 236 defines a plurality of relief passages 237. In the illustrated example, the relief passages 237 provide passages between the outer surface 220 of the valve plug 118 and openings 239 (e.g., an internal radius) of the apertures 234. In other words, as the valve plug 118 travels between the closed position and the open position, the relief passages 237 provide initial fluid receiving passages prior to the openings 239 of the apertures 234 to ensure that the fluid is not throttling on the opening 239 of the apertures 234. In some examples, the shapes, sizes, and/or geometries of the plurality of relief passages 237 varies for each of the apertures 234. Thus, the relief passages 237 of the illustrated example reduce and/or eliminate fluid flow variability through the apertures 234 as the valve plug 118 travels between the closed position and the open position. In the illustrated example, the relief passages 237 are fluidly coupled to the openings 239 of the apertures 234. In some examples, a diameter of the relief passages 237 is greater than a diameter of the openings 239. In other examples, the diameter of the relief passages 237 is less than or equal to the diameter of the openings 239.

In the illustrated example, the spiral relief channel 236 includes a plurality of ribs 238. The example ribs 238 are positioned on the side wall 204 of the cage body 202 and extend inward relative to the cage 124 to provide a sealing interface between the outer surface 220 of the valve plug 118 and the spiral relief channel 236. In some examples, the ribs 238 are angled relative to the longitudinal axis 235 of the apertures 234. As the valve plug 118 travels between the closed position and the open position, the example ribs 238 ensure that fluid does not flow through any apertures 234 that the valve plug 118 has not exposed. For example, as the valve plug 118 travels upward (e.g., towards the first end 208 of the cage body 202) and exposes a first row of apertures 234, the ribs 238 ensure that fluid does not flow through any apertures 234 beyond the first row of apertures 234. In the illustrated example, the ribs 238 separate each row of apertures 234 with respect to the longitudinal axis 214. In other examples, any pattern of ribs 238 may be used to allow control of fluid flow and anti-cavitation.

Figure 3:
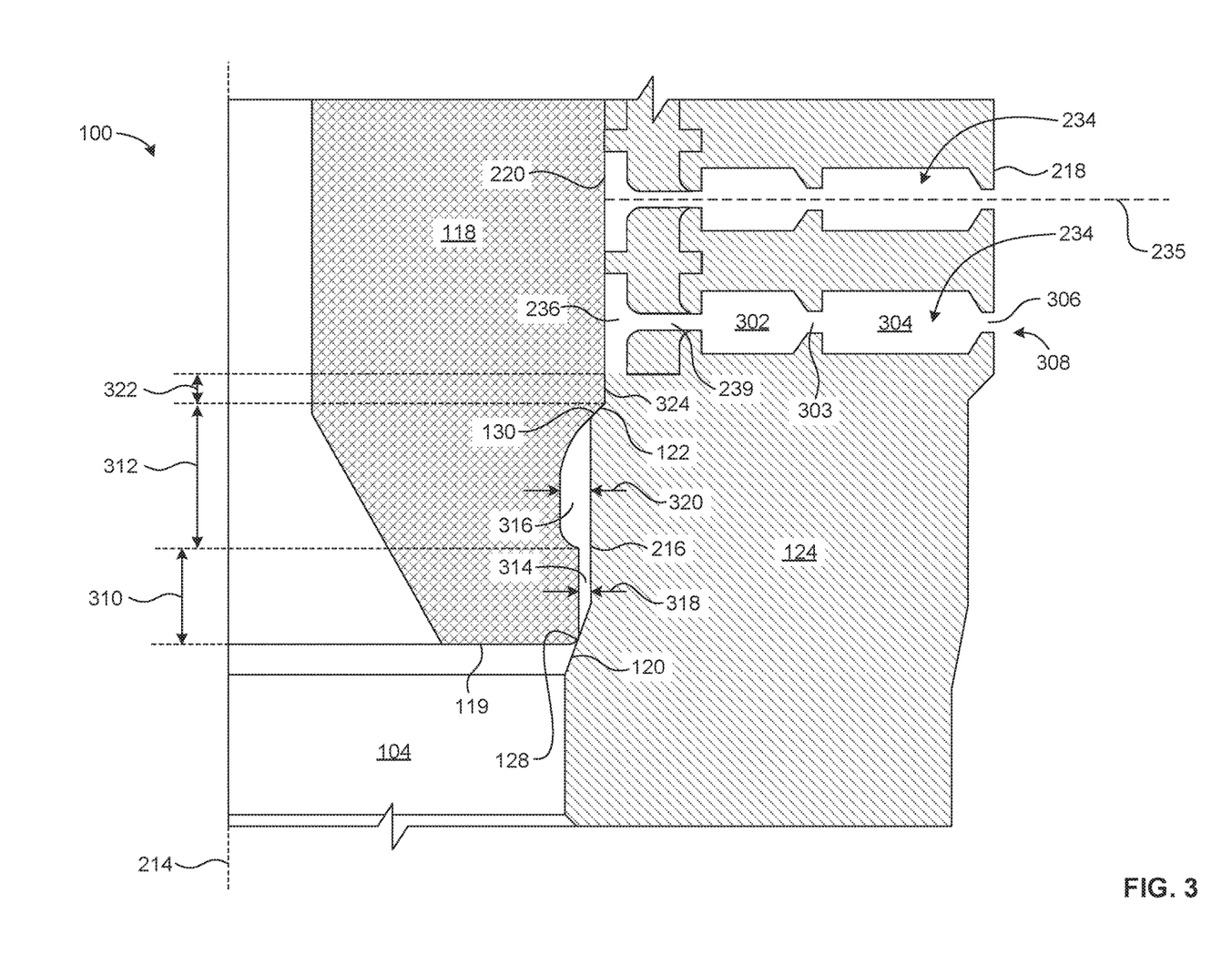
FIG. 3 is an enlarged cross-sectional view of a portion of the example control valve of FIGS. 1-2.

FIG. 3 is an enlarged cross-sectional view of a portion of the example control valve 100 of FIGS. 1-2. In the illustrated example, the first two rows of apertures 234 are shown. In some examples, a cross-section taken along the longitudinal axis 235 of the apertures 234 may include a linear shape, a tapered shape, an arcuate shape and/or any other shape and/or combination thereof defined by one or more pressure staged passages. The cage 124 can be formed via additive manufacturing (e.g., 3D Metal Printing, 3D Wax Printing, 3D Binder Jet Sand Mold Printing, etc.) to form a unitary cage including apertures 234 having one or more pressure staged passages. The example apertures 234 may include any number of pressure staged passages that are shaped to increase the pressure recovery produced by the cage 124 as fluid flows through the fluid flow passageway 104. In the illustrated example, the apertures 234 include a first pressure staged passage 302 and a second pressure staged passage 304. In other examples, the apertures 234 may include any number of pressure staged passages. The first pressure staged passage 302 and/or the second pressure staged passage 304 may include a diamond shape, a circular shape, an ovular shape, a polygonal shape and/or any other cross-sectional shape or profile and/or combination thereof. In the illustrated example, the opening 239 is fluidly coupled to the first pressure staged passage 302, and the first pressure staged passage 302 is fluidly connected to the second pressure staged passage 304 via a first throat 303. The first throat 303 is depicted as a channel between the first and second pressure staged passages 302, 304 that is shaped and/or sized to provide a certain pressure drop as fluid flows through the apertures 234. In the illustrated example, the second pressure staged passage 304 is fluidly connected to the outer surface 218 of the cage 124 via a second throat 306. The second throat 306 is depicted as a channel between the second pressure staged passage 304 and the outer surface 218 of the cage 124 that is shaped and/or sized to provide a certain pressure drop as fluid flows through the apertures 234. In some examples, the first pressure staged passage 302, the first throat 303, the second pressure staged passage 304, and/or the second throat 306 may have various geometries, sizes, and/or spacing to provide certain fluid flow characteristics and/or pressure drop characteristics.

In the illustrated example of FIG. 3, the valve plug 118 is in a fully closed position in which the primary and secondary sealing surfaces 128, 130 are sealingly engaged with the primary and secondary valve seats 120, 122, respectively. In the illustrated example, the primary sealing surface 128 is adjacent the first end 119 of the valve plug 118. The secondary sealing surface 130 is spaced away from the primary sealing surface 128 along the longitudinal axis 214 toward the second end 121 of the valve plug 118. When the valve plug 118 travels from the closed position to an open position (e.g., revealing the first row of apertures 308), the primary and secondary sealing surfaces 128, 130 disengage from the primary and secondary valves seats 120, 122 allowing fluid to flow through the control valve 100. As the valve plug 118 travels to an open position, the valve plug 118 travels upwards towards the first end 208 of the cage body 202.

In the illustrated example of FIG. 3, the valve plug 118 includes a first portion 310 and a second portion 312. The first portion 310 extends from the primary sealing surface 128 toward the secondary sealing surface 130 to form a flow restricted passage 314 (e.g., a restriction) between the inner surface 216 of the cage 124 and the outer surface 220 of the valve plug 118. In the illustrated example, the first portion 310 is substantially parallel to the inner surface 216 of the cage 124 to provide a uniform restricted flow as the fluid travels through the flow restricted passage 314. The flow restricted passage 314 is positioned above the primary valve seat 120. In the illustrated example, the flow restricted passage 314 is sized to provide a gap 318 between the outer surface 220 of the valve plug 118 and the inner surface 216 of the cage 124. In other words, as the valve plug 118 initially moves from the closed position to the open position, the flow restricted passage 314 is sized to reduce a velocity of the fluid as the fluid begins to flow up through the cage 124. Reducing the initial velocity of the fluid reduces erosion of the primary sealing surface 128 and/or the primary valve seat 120 to maintain a tight seal after repeated use.

In the illustrated example, the second portion 312 of the valve plug 118 extends from the first portion 310 to the secondary sealing surface 130 to form a recovery plenum 316. The recovery plenum 316 is positioned above the flow restricted passage 314 with respect to the longitudinal axis 214. In the illustrated example, the recovery plenum 316 extends from the flow restricted passage 314 to the secondary sealing surface 130. The recovery plenum 316 is a portion of the outer surface 220 of the valve plug 118 that is sized to provide a second gap 320 between the outer surface 220 of the valve plug 118 and the inner surface 216 of the cage 124. In the illustrated example, the first portion 310 of the valve plug 118 is less than the second portion 312. In the illustrated example, the recovery plenum 316 includes a varying radius to form a curved profile.

As the valve plug 118 travels from the closed position to the open position, fluid flows through the flow restricted passage 314 to reduce the initial velocity of the fluid. In the illustrated example, the fluid flows from the flow restricted passage 314 and into the recovery plenum 316. The recovery plenum 316 is sized to increase the pressure of the fluid to suit the needs of a particular control application. In the illustrated example, the flow restricted passage 314 and/or the recovery plenum 316 provide certain fluid flow characteristics and/or pressure drop characteristics of a fluid traveling through partially and/or fully open apertures 234 to reduce cavitation.

In the illustrated example, the inner surface 216 of the cage 124 includes a dead band area 322 extending from the second portion 312 of the valve plug 118 to the first row of apertures 308 to allow the fluid to begin flowing through the control valve 100 prior to entering one or more of the apertures 234. The dead band area 322 defines an example third portion 324 of the valve plug 118. In the illustrated example, the third portion 324 of the valve plug 118 is sized to closely engage the inner surface 216 of the cage 124. In other words, the third portion 324 of the valve plug 118 forms a tight-fit clearance shut-off (e.g., a sealing surface) to restrict fluid from flowing into the cage 124 when the valve plug 118 is in the closed position. In some examples, the third portion 324 of the valve plug 118 replaces the secondary sealing surface 130. In other examples, the third portion 324 of the valve plug 118 and the secondary sealing surface 130 restrict fluid from flowing into the cage 124 when the valve plug 118 is in the closed position. In other words, the dead band area 322 allows the valve plug 118 to travel upwards and increase the surface area of the inner surface 216 of the cage 124 between the secondary valve seat 122 and the first row of apertures 308 (with respect to the longitudinal axis 214). This increase in surface area between the secondary valve seat 122 and the first row of apertures 308 minimizes any pressure drops across the inner surface 216 of the cage 124 to reduce cavitation before the fluid enters the first row of apertures 308. In other examples, the dead band area 322 can be positioned below the secondary valve seat 122 to provide certain pressure drop characteristics to suit the needs of a particular control application. In other examples, the dead band area 322 can be positioned above or below the primary valve seat 120 and/or the secondary valve seat 122.

Figure 4:
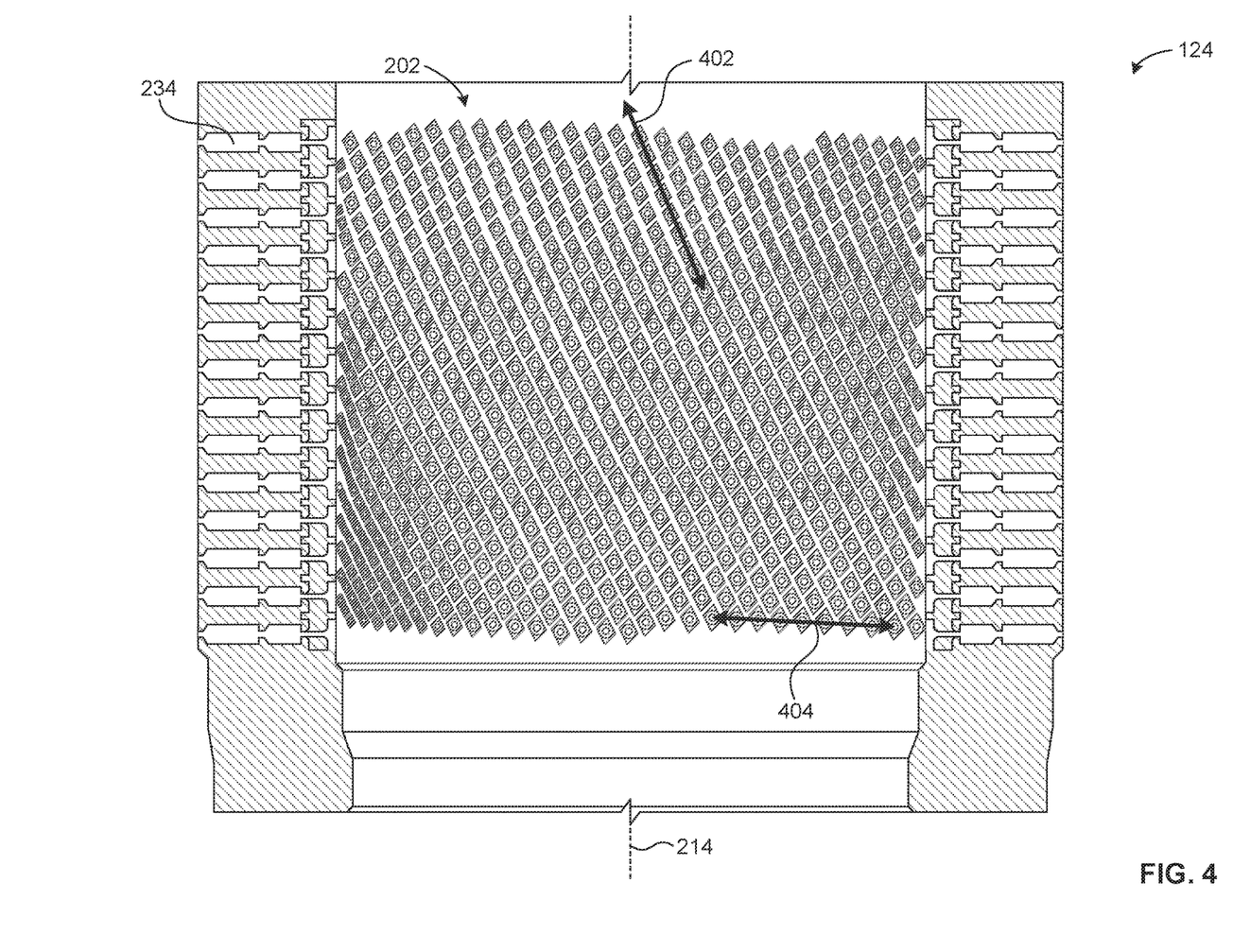
FIG. 4 is a cross-sectional view of the cage of the example control valve of FIGS. 1-2.

FIG. 4 is a partial cross-sectional view of the cage 124 of FIGS. 1-2. In some examples, the apertures 234 may be arranged along a helically-shaped path or pattern on the cage body 202. In the illustrated example, the apertures 234 are arranged in both a horizontal and vertical helically-shaped pattern on the cage body 202 with respect to the longitudinal axis 214. For example, the apertures 234 of the cylindrically-shaped cage body 202 are arranged along a vertical helical path 402 and a horizontal helical path 404. In some examples, the helically-arranged apertures 234 of the cage body 202 produce a constant pressure recovery and/or predictable (e.g., linear, exponential, etc.) rate of change of flow capacity as the valve plug 118 moves between the closed position and the open position.

From the foregoing, it will be appreciated that example methods, apparatus and articles of manufacture have been disclosed that enable a valve trim to provide certain fluid flow characteristics and/or pressure drop characteristics to reduce cavitation in a control valve. Example valve trims have been disclosed that provide various pressure-staged apertures to control pressure drops and reduce cavitation. Furthermore, example valve trims have been disclosed that reduce pressure throttling on an opening of the apertures, and restrict fluid from flowing beyond a position of a valve plug. Example valve trim have been disclosed that reduce an initial velocity of a fluid as the fluid begins to flow up through a cage to reduce erosion of a sealing surface to maintain a tight seal after repeated use.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. Valve trim apparatus for use with a fluid valve comprising:
a cage positioned in a fluid flow passageway of a valve body, the cage including a primary valve seat and a secondary valve seat;
a valve plug slidably positioned within the cage, the valve plug including a primary sealing surface to sealingly engage the primary valve seat and a secondary sealing surface to sealingly engage the secondary valve seat, the primary sealing surface adjacent to a first end of the valve plug and the secondary sealing surface spaced away from the primary sealing surface along a first longitudinal axis of the valve plug toward a second end of the valve plug, the valve plug having a first portion extending from the primary sealing surface toward the secondary sealing surface to form a flow restricted passage between an inner surface of the cage and the first portion, the flow restricted passage sized to provide a gap between an outer surface of the valve plug and the inner surface of the cage, the valve plug having a second portion extending from the first portion to the secondary sealing surface to form a recovery plenum adjacent to the flow restricted passage, the recovery plenum between the second portion and the inner surface of the cage, wherein a first diameter of the first portion is less than a second diameter of the second portion; and
a spiral relief channel defining a plurality of relief passages fluidly coupled to a plurality of apertures positioned between the inner surface of the cage and an outer surface of the cage, the apertures including a first pressure staged passage fluidly coupled to a second pressure staged passage, a first relief passage adjacent to the first pressure staged passage, the first relief passage, the first pressure staged passage, and the second pressure staged passage positioned along a second longitudinal axis, the second longitudinal axis perpendicular to the first longitudinal axis extending along an opening of a body of the cage supporting the valve plug, the first pressure staged passage including a first narrowed region connecting to a first narrowed throat positioned adjacent the first pressure staged passage and the second pressure staged passage including a second narrowed region connecting to a second narrowed throat positioned adjacent the second pressure staged passage, wherein fluid flows through the apertures from the outer surface of the cage to the inner surface of the cage along the second longitudinal axis, and the first narrowed region, the second narrowed region, the first narrowed throat, and the second narrowed throat are narrowed with respect to the second longitudinal axis.

2. The valve trim apparatus of claim 1, wherein the first portion of the valve plug is substantially parallel to the inner surface of the cage to provide a uniform restricted flow throughout the first portion of the valve plug.

3. The valve trim apparatus of claim 1, wherein the second portion of the valve plug includes a varying radius to form a curved profile of the recovery plenum.

4. The valve trim apparatus of claim 1, wherein the primary valve seat is a ramped surface defined by an angled transition between a first dimension of the inner surface of the cage and a second dimension of the inner surface of the cage, wherein the second dimension is greater than the first dimension.

5. The valve trim apparatus of claim 1, wherein the plurality of relief passages are fluidly coupled to openings of the apertures to reduce pressure throttling, wherein a first diameter of the relief passages is greater than a second diameter of the openings.

6. The valve trim apparatus of claim 1, wherein the cage includes a dead band area extending from the second portion to a first row of apertures of the cage to allow the second sealing surface to disengage from the secondary valve seat to minimize a pressure drop in a fluid before the fluid enters the first row of apertures.

7. Valve trim apparatus for use with a fluid valve comprising:
a cage positioned in a fluid flow passageway of a valve body, the cage including a primary valve seat and a secondary valve seat;
a valve plug movably coupled relative to the cage, the valve plug including a primary sealing surface to sealingly engage the primary valve seat and a secondary sealing surface to sealingly engage the secondary valve seat, the primary sealing surface adjacent to a first end of the valve plug and the secondary sealing surface spaced away from the primary sealing surface, the valve plug having a first portion extending from the primary sealing surface toward the secondary sealing surface, the first portion sized to reduce a velocity of a fluid when the valve plug moves between a closed position and an open position, the valve plug having a second portion extending from the first portion to the secondary sealing surface, the second portion sized to receive the fluid from the first portion and increase a pressure of the fluid, wherein a first diameter of the first portion is less than a second diameter of the second portion, an inner surface of the cage and first portion forming a flow restricted passage sized to provide a gap between an outer surface of the valve plug and the inner surface of the cage when the valve plug is in the closed position; and
a spiral relief channel defining a plurality of relief passages fluidly coupled to a plurality of apertures positioned between the inner surface of the cage and an outer surface of the cage, wherein a first aperture is adjacent to a second aperture, and a center point of the first aperture is along a first longitudinal axis, which is perpendicular to a second longitudinal axis, and the second center point of the second aperture is along a third longitudinal axis, which is perpendicular to the second longitudinal axis, wherein the first aperture and the second aperture are not in the same horizontal plane, the apertures including a first pressure staged passage fluidly coupled to a second pressure staged passage, a first relief passage adjacent to the first pressure staged passage, the first relief passage, the first pressure staged passage, and the second pressure staged passage positioned along the first longitudinal axis, the first pressure staged passage including a narrowed region connecting to a first throat positioned adjacent the first pressure staged passage or the second pressure staged passage including a narrowed region connecting to a second throat positioned adjacent the second pressure staged passage.

8. The valve trim apparatus of claim 7, wherein the second portion of the valve plug includes a varying radius.

9. The valve trim apparatus of claim 7, wherein the plurality of relief passages are fluidly coupled to openings of the apertures, wherein a first diameter of the relief passages is greater than a second diameter of the openings.

10. The valve trim apparatus of claim 7, wherein the cage further includes a plurality of ribs extending inward relative to the cage to provide an interface between the cage and the valve plug to restrict fluid from flowing beyond a position of the valve plug.

11. The valve trim apparatus of claim 7, wherein the cage includes a dead band area extending from the second portion to a first row of apertures of the cage to minimize a pressure drop in a fluid before the fluid enters the first row of apertures.

12. Valve trim apparatus for use with a fluid valve comprising:
a cage positioned in a fluid flow passageway of a valve body; and
a spiral relief channel defining a plurality of relief passages fluidly coupled to a plurality of apertures positioned between an inner surface of the cage and an outer surface of the cage, the apertures including a first pressure staged passage fluidly coupled to a second pressure staged passage, a first relief passage adjacent to the first pressure staged passage, the first relief passage, the first pressure staged passage, and the second pressure staged passage positioned along a first longitudinal axis, the first longitudinal axis perpendicular to a second longitudinal axis, the first pressure staged passage including a first narrowed region connecting to a first narrowed throat positioned adjacent the first pressure staged passage and the second pressure staged passage including a second narrowed region connecting to a second narrowed throat positioned adjacent the second pressure staged passage, wherein fluid flows through the apertures from the outer surface of the cage to the inner surface of the cage along the first longitudinal axis, and the first narrowed region, the second narrowed region, the first narrowed throat, and the second narrowed throat are narrowed with respect to the first longitudinal axis.

13. The valve trim apparatus of claim 12, wherein the plurality of relief passages fluidly are coupled to openings of the apertures to reduce pressure throttling, wherein a first diameter of the relief passages is greater than a second diameter of the openings.

14. The valve trim apparatus of claim 12, wherein the cage includes a dead band area to minimize a pressure drop in a fluid before the fluid enters a first row of apertures.

15. The valve trim apparatus of claim 12, wherein a first one of the apertures is adjacent to a second one of the apertures, and a first center point of the first one of the apertures is along a third longitudinal axis, which is perpendicular to the first longitudinal axis, and a second center point of the second one of the apertures is along a fourth longitudinal axis, which is perpendicular to the first longitudinal axis, wherein the first one of the apertures and the second one of the apertures are not in the same horizontal plane.

* * * * *